United States Patent [19]

Volk

[11] Patent Number: 4,770,127

[45] Date of Patent: Sep. 13, 1988

[54] ANIMAL RESTRAINING APPARATUS

[76] Inventor: Seymour A. Volk, P.O. Box 816, Belle Fourche, S. Dak. 57717

[21] Appl. No.: 916,894

[22] Filed: Oct. 8, 1986

[51] Int. Cl.$^4$ .................. A01K 29/00; A62B 35/00
[52] U.S. Cl. ........................................ 119/96; 119/17
[58] Field of Search .................. 119/17, 19, 96, 98, 119/103

[56] References Cited

U.S. PATENT DOCUMENTS

| | | | |
|---|---|---|---|
| 2,593,559 | 4/1952 | Heldenbrand | 119/99 |
| 2,616,392 | 11/1952 | Hutchings | 119/98 |
| 3,399,654 | 9/1968 | Schroer | 119/96 |
| 3,547,079 | 12/1970 | Bassett | 119/96 |
| 3,760,768 | 9/1973 | Patterson | 119/96 |
| 3,875,902 | 4/1975 | Gasper | 119/17 |
| 3,918,406 | 11/1975 | Patterson | 119/96 |
| 4,367,696 | 1/1983 | Hamann | 119/96 |

FOREIGN PATENT DOCUMENTS

| | | | |
|---|---|---|---|
| 229348 | 7/1960 | Australia | 119/98 |
| 2250510 | 6/1975 | France | 119/96 |
| 827109 | 3/1960 | United Kingdom | 119/98 |

*Primary Examiner*—John J. Wilson
*Assistant Examiner*—Michael Lynch
*Attorney, Agent, or Firm*—Arthur L. Urban

[57] ABSTRACT

Animal restraining apparatus includes a cage portion, a door portion, a door locking portion, a movable restraint portion and a restraint actuating portion. The cage portion includes a top section, a bottom section, a sidewall section and an end section with barrier sections covering the respective sections. The door portion includes a movable door member covering a quadrangular end opening with a rod section disposed along each vertical side edge of the end opening and an eyelet extending from each lower corner of the door member in slideable engagement with the rod sections. The door locking portion includes engaging mechanism adjacent an upper end of the door member, the engaging mechanism including a pivoting first handle member selectively engageable with an adjacent edge of the top section. The movable restraint portion includes an elongated panel section enclosing free edges of the top, bottom, end sections and the door portion but spaced therefrom, the elongated panel section being oriented substantially parallel with the sidewall section. A panel supporting section extends between free edges of opposing cage sections and pivoting link members join the panel section with the supporting section. The restraint actuating portion includes an elongated second handle member extending outwardly from the panel section and panel locking mechanism disposed along the length of the second handle member selectively engageable with the supporting section.

19 Claims, 2 Drawing Sheets

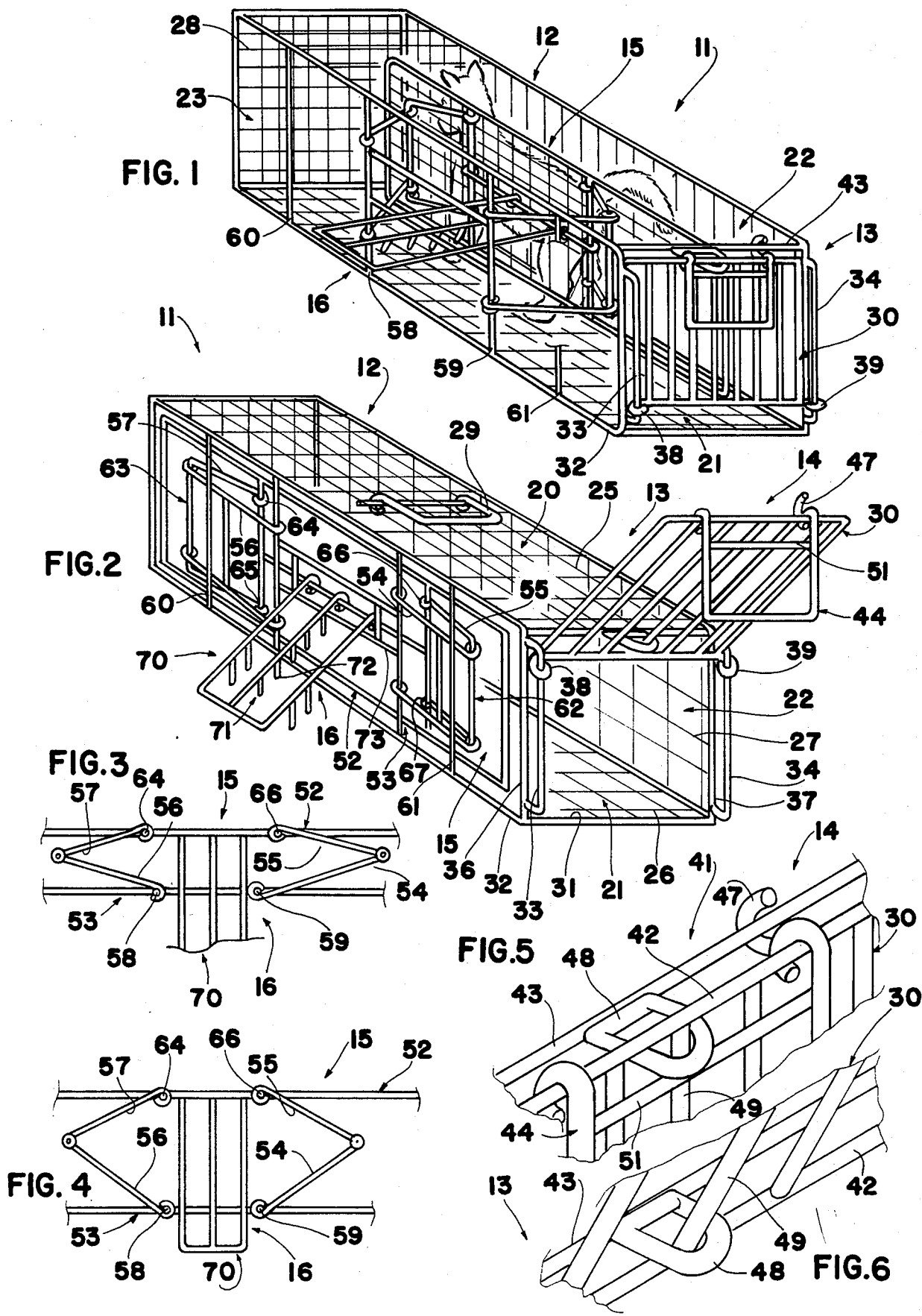

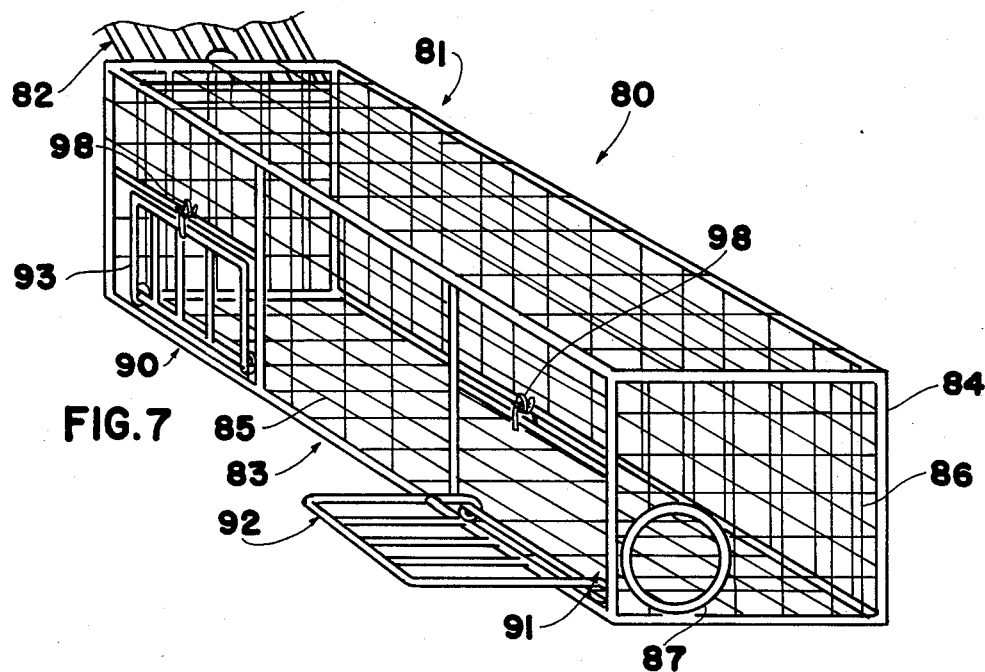
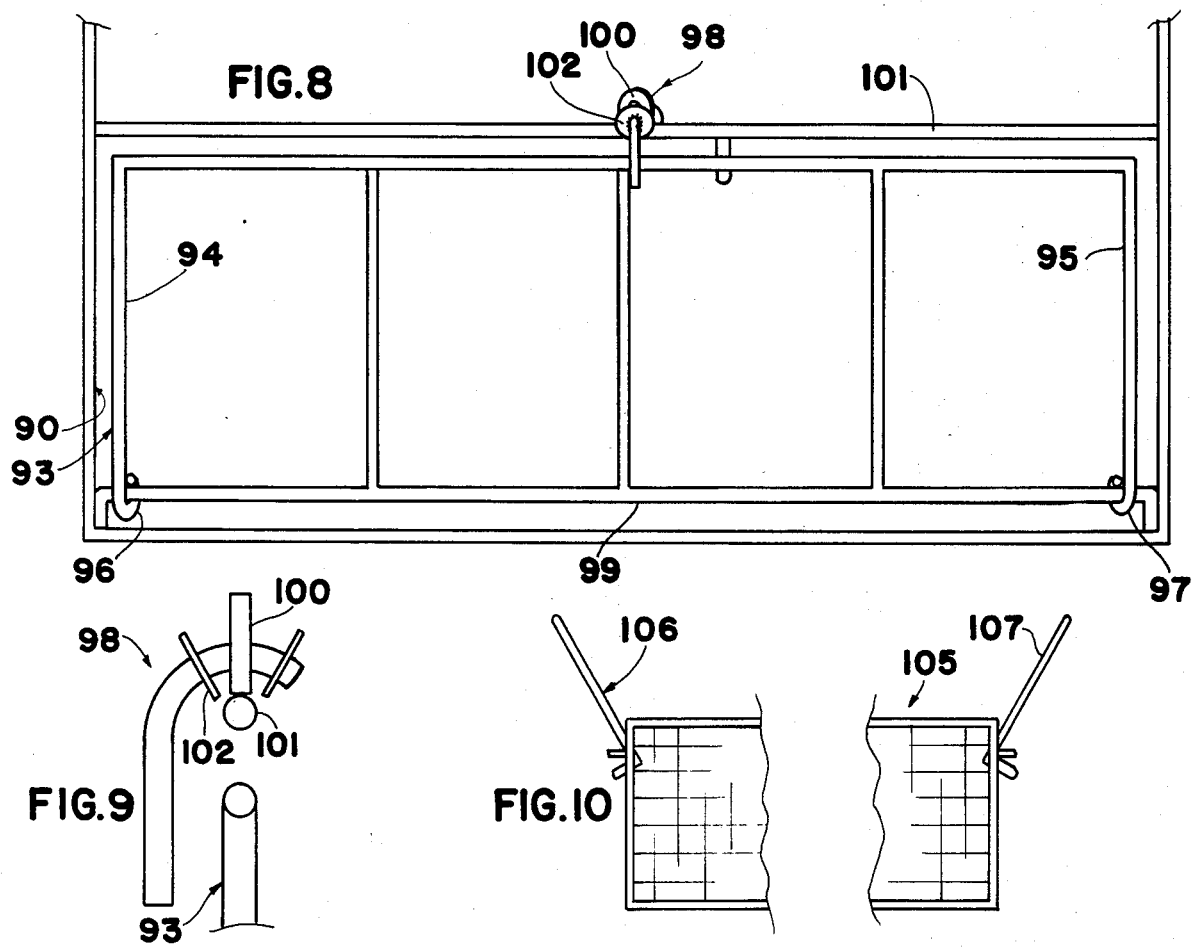

ANIMAL RESTRAINING APPARATUS

This invention relates to a novel animal apparatus and more particularly relates to a new apparatus for restraining an animal.

As civilization has developed, human beings have attempted to control animals. Through the centuries, this control has involved the domestication of animals such as horses, cows, dogs, cats, etc. Also, man has worked with and trained various wild animals both for utilitarian and experimental purposes.

In the handling and care of such animals, it frequently is customary to have close contact with the animals. Originally, this contact was achieved by binding the animals with ropes to restrain them, Later, for large animals such as horses and cows, chutes have been developed that are only slightly wider than the animal. By closing the chute in front and behind an animal, it is possible to confine it in a space only slightly larger than its own size.

With an animal confined in the chute, persons can move close to the animal and even touch it without fear of injury. The animal can be examined and/or treated easily and quickly. Although most chutes originally were permanently constructed at a fixed location, portable chutes now are available that can be moved to the place the animal is located.

While such chutes are widely used for large animals, they are much too large to be used successfully for small animals. When it is desired to confine smaller animals, this is customarily accomplished by placing the animal in a cage. However, such confinement makes it difficult to examine an animal inside the cage.

To tough a small animal it is customary to use manpower to hold the animal down. This requires the services of an extra person in addition to the individual who is examining or treating the animal. Although the person holding the animal must have sufficient strength to totally restrain the animal, there always is the risk that the animal will overpower the holder, particularly if the animal becomes fearful or anxious.

Another way to restrain a small animal is to strap it to an examining table. However, it may be very difficult to transfer the animal to the table and position it thereon so that it can be strapped down. Individuals also have fabricated their own makeshift designs to provide some degree of confinement but this requires conceptual and constructional talent and experience as well as considerable time and expense.

From the above discussion, it is clear that previous devices and methods for restraining small animals have not provided desirable solutions in many situations. Thus, there is a need for a new and different means and procedure for confining small animals.

The present invention provides a novel animal restraining apparatus which overcomes the deficiencies of earlier devices and methods. In addition, the animal restraining apparatus of the invention not only overcomes such shortcomings, but also provides features and advantages not found in previous expedients. The apparatus restrains animals completely without continuing attention. This enables a single individual to confine an animal and then examine and/or treat it alone without assistance from another person.

The restraining apparatus confines an animal so that it cannot injure itself or those attending to it. The apparatus provides a relatively large entrance so the animal is less reluctant to enter. After confinement is achieved, restraint of the animal is accomplished easily and quickly.

The animal restraining apparatus of the present invention is simple in design and can be produced relatively inexpensively. Commercially available materials and components can be utilized in the manufacture thereof. Conventional fabricating techniques and procedures and semi-skilled labor can be employed in the production of the apparatus.

The restraining apparatus is durable in construction and has a long useful life. Little, if any, maintenance is required to keep the apparatus in good working condition.

The apparatus of the invention can be used efficiently by persons with limited aptitude and experience. The animal restraining apparatus can be locked in a number of positions to accommodate different size animals. Access openings are provided to permit touching of particular parts of an animal. The apparatus is light in weight and can be transported conveneiently. The apparatus can be modified to accommodate different species and to facilitate desired examination and treatment procedures.

These and other benefits and advantages of the novel animal restraining apparatus of the present invention will be apparent from the following description and the accompanying drawings in which:

FIG. 1 is a view in perspective of one form of animal restraining apparatus of the invention with an animal confined therein;

FIG. 2 is a view in perspective of the restraining apparatus shown in FIG. 1 with the door and restraint portions in an open position;

FIG. 3 is a fragmentary top view of the restraint and restraint actuating portions in an open position;

FIG. 4 is a fragmentary top view of the restraint and restraint actuating portions shown in FIG. 3 in a restraining position.

FIG. 5 is an enlarged fragmentary view in perspective of the door and door locking portions of the restraining apparatus as shown in FIG. 1;

FIG. 6 is an enlarged fragmentary view in perspective of the door and door locking portions of the restraining apparatus as shown in FIG. 2;

FIG. 7 is a view in perspective of another form of animal restraining apparatus of the invention;

FIG. 8 is an enlarged fragmentary side view of an access opening of the animal restraining apparatus shown in FIG. 7;

FIG. 9 is a fragmentary sectional view taken along line 9—9 of FIG. 8; and

FIG. 10 is a schematic side view of a further form of animal restraining apparatus of the invention.

As shown in the drawings, one form of animal restraining apparatus 11 of the present invention includes a cage portion 12, a door portion 13, a door locking portion 14, a movable restraint portion 15, and a restraint actuating portion 16.

The cage portion 12 of the animal restraining apparatus 11 includes a top section 20, a bottom section 21, a sidewall section 22 and an end section 23. Barrier sections 25, 26, 27 and 28 cover the respective sections 20–23. Advantageously, the top, bottom and sidewall sections are elongated sections as shown. The barrier sections 25–28 perferably include wire panels. The cage portion advantageously includes a carrying handle 29 extending upwardly from the top section 20.

The door portion 13 of the animal restraining apparatus 11 of the invention includes a movable door member 30 that covers a quadrangular end opening 31 located at one end 32 of the cage portion. A rod section 33 or 34 is disposed along each vertical side edge 36 and 37 of the opening 31. Eyelet means 38 or 39 extend from each lower corner of the door member 30. The eyelets 38 and 39 are in slideable engagement with rod sections 33 and 34 respectively.

The door locking portion 14 of the animal restraining apparatus 11 includes engaging means 41 adjacent an upper end 42 of the door member 30. The engaging means 41 is selectively engageable with an adjacent edge 43 of the top section 20. As shown in FIGS. 1, 2 and 5, the engaging means 41 includes a pivoting first handle member 44.

Locking of the door member 30 advantageously may be achieved by including hook means 47 extending from first handle member 44 adjacent the upper edge 42 of the door member 30. Hook 47 wraps around edge 43 of the top section 20.

Alternatively or complimentary to hook means 47, an eyelet or D-section 48 extends horizontally from adjacent edge 43 of the top section 20 to slideably engage a central vertical rod member 49 of the door member 30. Locking is achieved by securing a cross bar 51 disposed horizontally along the first handle member 44 at a point thereon so the cross bar will be positioned tightly below the eyelet or D-section 48 when the handle 44 is pivoted into contact with the door member as shown in FIGS. 1 and 5.

The movable restraint portion 15 of the animal restraining apparatus 11 of the invention includes an elongated panel section 52 enclosing free edges of the top 20, bottom 21, end section 23 and door portion 13. The edges of the panel section are spaced slightly from the respective sections. The elongated panel section 52 is oriented substantially parallel with the sidewall section 22 of the cage portion.

A panel supporting section 53 extends between free edges of the opposing cage sections. Pivoting link members 54 and 55 join the panel section with the supporting section. The panel supporting section 53 advantageously includes spaced vertical bar members 58 and 59. Preferably, the panel supporting section also includes additional spaced vertical bar members 60 and 61 disposed closer to the ends of the top and bottom sections.

Advantageously, pairs of the pivoting link members 54, 55 and 56, 57 are included. The pivoting link members 54 and 56 are pivotally connected to the vertical bar members 58 and 59. In a preferred construction, the pivoting link members 54–57 are part of vertically oriented link assemblies 62 and 63. Such assemblies may be pivotally connected to panel section 52 at spaced points 64, 65, 66 and 67 along the upper and lower edges thereof.

The restraint actuating portion 16 of the animal restraining apparatus 11 of the invention includes an elongated second handle member 70. The handle member 70 extends outwardly from the panel section 52. Panel locking means 71 is disposed along the length of the handle member. The locking means is engageable with the supporting section 53.

The panel locking means 71 advantageously includes stub sections 72. The stub sections 72 are spaced along the length of the second handle member 70 and preferably along a centerline thereof. One of the stub sections may be selectively engageable with a horizontal bar 73 carried by the supporting section 53. The first and second handle members 44 and 70 respectively advantageously have generally U-shaped configurations.

FIGS. 7–10 illustrate desirable structural modifications of the animal restraining apparatus 11 shown in FIGS. 1–6. As shown in FIG. 7, another form of animal restraining apparatus 80 of the invention is similar to restraining apparatus 11 described above and includes a cage portion 81 and a door portion 82, together with a door locking portion, a movable restraint portion, and a restraint actuating portion, none of which are shown.

In addition to the common components, the restraining apparatus 80 also includes an end section 84 with a barrier section 86. An opening 87, generally circular, advantageously is located in the end section, or a door, preferably adjacent a corner thereof as shown.

The restraining apparatus 80 further includes a sidewall section 83 with a barrier section 85. At least one access opening 90 and advantageously a pair of access openings 90 and 91 are located in the sidewall section.

The access openings 90 and 91 include door portions 93 and 92 respectively. The door portions preferably may be pivotally supported over the access openings through vertical side bar members 94 and 95 which include eyelets 96 and 97 respectively. The eyelets are carried by a horizontal bar member 99 extending along a bottom edge of each opening.

With the door portions pivotable along their lower edges, locking means 98 advantageously is located along the upper edge of each door. As shown in FIGS. 7–9, locking means 98 may include a U-shaped section 103 pivotally carried in an eye 100 affixed to a bar member 101 disposed along an upper edge of each opening 90, 91. To prevent accidental withdrawal of the U-shaped section from the eye, washers 102 may be affixed thereto on either side of the eye.

FIG. 10 illustrates schematically a further form of animal restraining apparatus 105. Apparatus 105 is similar to apparatus 11 and in addition includes door portions 106 and 107 with one at each end of the cage portion. This construction facilitates removal of an animal from the apparatus after examination and/or treatment is completed.

The restraining apparatus of the present invention can be fabricated from a variety of different materials including metals, wood, plastics and combinations thereof. Advantageously, the apparatus is formed with a steel rod frame and wire mesh panels. The size of the apparatus will depend upon the size of the animal being confined.

In the use of the animal restraining apparatus 11 of the present invention as shown in FIGS. 1–6, the apparatus is placed in a location adjacent to the animal that is to be restrained. Then, second handle member 70 is drawn upwardly and outwardly to draw panel section 52 away from sidewall section 22 and thereby enlarge the interior space within cage portion 12.

To open door member 30, the free end of first handle member 44 is pivoted outwardly releasing door locking portion 14. Pulling handle member 44 upward draws door member 30 upward along rod sections 33 and 34 and away from cage end opening 31. As the door tilts forward, eyelets 38 and 39 are locked frictionally on the upper ends of the rod sections. It will be apparent that opening and closing of door member 30 can be achieved easily with one hand.

The head of the animal is placed into opening 31 and the animal's body is forced into the cage portion 12.

When the animal is completely within the cage, the upper end 42 of the door member is moved backward away from the user releasing eyelets 38, 39 and allowing the door member to slide down to a closed position.

To restrain the animal against movement with the cage portion 12, second handle member 70 is raised, freeing it to push panel section 52 into contact with the animal's body. The position of the panel section is locked against the animal by lowering the handle 70 so stub sections 72 engage the horizonal bar 73.

The animal at this point is completely restrained so it can be examined and/or treated without anaesthetizing it and without risk of injury to the animal or to the examining individual. This continuing restraint is accomplished without requiring an attendant to hold the animal.

FIGS. 7-9 illustrate refinements of the apparatus of the invention which facilitate access to desired parts of the animal. For examination of the head, a circular opening 87 is located in end section 84 of restraining apparatus 80. With the restraint panel section 52 in contact with the animal, the animal can be maneuvered so its head extends through the opening 87.

Access to the animal's legs and underbody can be afforded through access openings 90 and 91. Opening door 92 and 93 by unlocking means 98 after the animal is restrained within the cage portion 12 provides clear access to the parts of the animal without releasing the restraint of the animal's body. This restraint is acheived on a continuing basis without assistance from another person.

When the examination and treatment are completed, the restraining panel 62 is released by raising handle 70 to unlock it. Door member 80 is raised again, permitting the animal to back out of the cage portion 12. As shown in FIG. 10, a second door member 106 may be located at the opposite end of the cage portion to facilitate forward exiting of the animal therefrom without having to retreat from the cage.

The above description and the accompanying drawings show that the present invention provides a novel animal restraining apparatus with features and advantages not found in earlier restraints. Using the restraining apparatus of the invention, an individual can load, confine, restrain, examine and treat an animal without assistance from another person. The apparatus restrains an animal completely on a continuing basis without further attention. The apparatus prevents an animal from injuring itself or the person attending to it.

The animal restraining apparatus is simple in design and is relatively inexpensive. Commercially available materials and components and conventional cage fabricating methods can be employed in the manufacture of the restraining apparatus. The apparatus is durable in construction and has a long useful life without significant maintenance. There are no springs or hinges to stick or deteriorate.

The animal restraining apparatus can be used efficiently by persons with limited strength and dexterity after a minimum of instruction. The door portion can be opened and closed with one hand conveniently while an individual holds an animal in position. Complete restraint of the animal within the cage can be achieved with one hand in a single movement. Contact with desired parts of the animal is provided through various access openings.

The restraining apparatus is light in weight and easily transported. The restraining portion can be positioned to positively restrain animals of different sizes and body shapes.

It will be apparent that various modifications can be made in the particular restraining apparatus described in detail above and shown in the drawings within the scope of the present invention. The size, configuration and arrangement of components can be different to meet specific requirements. The location of the access openings can be changed. The door and restraining panel locking mechanisms can be of other designs. These and other changes can be made in the restraining apparatus provided the functioning and operation thereof are not adversely affected. Therefore, the scope of the present invention is to be limited only by the following claims.

What is claimed is:

1. Animal restraining apparatus including a cage portion, a door portion, a door locking portion, a movable restraint portion and a restraint actuating portion; said cage portion incluindg a top section, a bottom section, a sidewall section and an end section, barrier sections covering said top, bottom, sidewall and end sections; said door portion including a movable door member covering a quadrangular end opening, a rod section disposed along each vertical side edge of said end opening, eyelet means extending from each lower corner of said door member in slideable engagement with said rod sections; said door locking portion including engaging means adjacent an upper end of said door member, said engaging means including a pivoting first handle member selectively engageable with an adjacent edge of said top section; said movable restraint portion including an elongated floating panel section enclosing free edges of said top, bottom, end sections and said door portion but spaced therefrom, said elongated panel section being oriented suubstantially parallel with said sidewall section, a panel supporting section extending between free edges of opposing cage sections, pivoting link support members joining said floating panel section with said supporting section; said restraint actuating portion including an elongated section handle member extending outwardly from said panel section centrally thereof, panel locking means disposed along the length of said handle member selectively engageable with said supporting section; whereby an animal may be restrained within said apparatus by raising said door member, inserting said animal within said cage portion, lowering said door member,pushing said second handle member to move said panel section toward said opposite sidewall section and fixing the position thereof by engaging said locking means with said supporting section.

2. Animal restraining apparatus according to claim 1 wherein said cage portion includes elongated top, bottom and sidewall sections.

3. Animal restraining apparatus according to claim 1 wherein said barrier sections include wire panels.

4. Animal restraining apparatus according to claim 1 wherein said door member includes spaced bar members.

5. Animal restraining apparatus according to claim 1 wherein said end section includes a generally circular opening.

6. Animal restraining apparatus according to claim 1 wherein said sidewall section includes at least one closeable access opening.

7. Animal restraining apparatus according to claim 1 wherein said end section includes a closeable access opening.

8. Animal restraining apparatus according to claim 1 wherein said first handle member is pivotably connected adjacent an upper edge of said door member.

9. Animal restraining apparatus according to claim 1 wherein said first handle member includes hook means engageable with an adjacent edge of said top section;

10. Animal restraining apparatus according to claim 1 wherein said door portion includes an eyelet extending from an adjacent edge of said top section, said eyelet being slideably engageable with a central vertical rod member of said door member.

11. Animal restraining apparatus according to claim 10 wherein said first handle member includes a horizontal cross bar engageable under said eyelet.

12. Animal restraining apparatus according to claim 1 wherein said panel supporting section includes spaced vertical bar members.

13. Animal restraining apparatus according to claim 12 wherein said panel supporting section includes additional spaced vertical bar members disposed closer to ends of said top and bottom sections.

14. Animal restraining apparatus according to claim 12 wherein said pivoting link members are pivotally connected to said vertical bar members.

15. Animal restraining apparatus according to claim 14 including pairs of spaced pivoting link members.

16. Animal restraining apparatus according to claim 14 wherein said pivoting link members are part of vertically oriented link assemblies.

17. Animal restraining apparatus according to claim 16 wherein said pivoting link assemblies are pivotally connected to said panel section at spaced points along upper and lower edges thereof.

18. Animal restraining apparatus according to claim 1 wherein said panel locking means includes stub sections spaced along the length of said second handle member engageable with a horizontal bar carried by said panel supporting section.

19. Animal restraining apparatus according to claim 1 wherein said handle members have a generally U-shaped configuration.

* * * * *